US010065314B2

United States Patent
Tian et al.

(10) Patent No.: US 10,065,314 B2
(45) Date of Patent: *Sep. 4, 2018

(54) SYSTEM AND METHOD FOR MANIPULATION PLATFORM

(71) Applicant: General Electric Company, Schenectady, NY (US)

(72) Inventors: Tai-Peng Tian, Niskayuna, NY (US); Charles Theurer, Niskayuna, NY (US); Balajee Kannan, Niskayuna, NY (US); Huan Tan, Niskayuna, NY (US); Arpit Jain, Niskayuna, NY (US); Guiju Song, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/216,192

(22) Filed: Jul. 21, 2016

(65) Prior Publication Data

US 2016/0325432 A1    Nov. 10, 2016

Related U.S. Application Data

(63) Continuation-in-part of application No. 14/473,241, filed on Aug. 29, 2014, now Pat. No. 9,415,513.

(Continued)

(51) Int. Cl.
  *B25J 9/16* (2006.01)
  *B25J 5/00* (2006.01)
  (Continued)

(52) U.S. Cl.
  CPC ............. *B25J 9/1666* (2013.01); *B25J 5/007* (2013.01); *B25J 9/1697* (2013.01); *B25J 19/023* (2013.01);
  (Continued)

(58) Field of Classification Search
  CPC ........ B25J 9/1666; B25J 5/007; B25J 9/1697; B25J 19/023; B25J 9/163; Y10S 901/01; Y10S 901/09; G05D 1/0214; G06K 7/146
  See application file for complete search history.

(56) References Cited

U.S. PATENT DOCUMENTS

| 5,300,869 A | * | 4/1994 | Skaar | ...................... B25J 5/007 |
| | | | | 318/568.12 |
| 8,577,126 B2 | * | 11/2013 | Jones | ...................... G06F 3/017 |
| | | | | 348/114 |

(Continued)

OTHER PUBLICATIONS

Qi et al., Dual-arm service robots for mobile operation in indoor environment, 2012, IEEE, p. 1898-1903 (Year: 2012).*

(Continued)

*Primary Examiner* — McDieunel Marc
(74) *Attorney, Agent, or Firm* — GE Global Patent Operation; Pabitra Chakrabarti

(57) ABSTRACT

A manipulation platform includes a navigation system, manipulation arm, and one or more area sensors. The navigation unit locates a position of the manipulation platform, and a manipulation arm has a device or a collection sensor. The area sensors acquire data representative of at least a portion of an area in which the manipulation platform is located. Processors determine or predict a presence of an external object within a manipulation range of the manipulation arm using the data acquired by the one or more area sensors. The processors respond to a determination of the external body being, or being predicted to be, within the manipulation range by controlling one or more of the manipulation arm or the manipulation platform.

20 Claims, 4 Drawing Sheets

Related U.S. Application Data

(60) Provisional application No. 62/343,615, filed on May 31, 2016.

(51) Int. Cl.
*G05D 1/02* (2006.01)
*B25J 19/02* (2006.01)

(52) U.S. Cl.
CPC ........... *G05D 1/0214* (2013.01); *Y10S 901/01* (2013.01); *Y10S 901/09* (2013.01)

(56) References Cited

U.S. PATENT DOCUMENTS

| | | | |
|---|---|---|---|
| 2009/0180668 A1* | 7/2009 | Jones | G06F 3/017 382/103 |
| 2010/0243344 A1* | 9/2010 | Wyrobek | B25J 5/007 180/21 |
| 2015/0363625 A1* | 12/2015 | Wu | G06K 7/146 382/203 |
| 2016/0096272 A1* | 4/2016 | Smith | B25J 9/163 700/253 |
| 2017/0076194 A1* | 3/2017 | Versace | G06N 3/008 |

OTHER PUBLICATIONS

Song et al., Mobile manipulation and visual servoing design of a configurable mobile manipulator, 2013, IEEE, p. 239-244 (Year: 2013).*

Crowley, Integration and control of reactive visual processes for visual navigation, 1994, Internet, p. 32-38 (Year: 1994).*

Lemburg et al., AILA—design of an autonomous mobile dual-arm robot, 2011, IEEE, p. 5147-5153 (Year: 2011).*

Castillo-Effen, M., et al., Robot system for asset health management, GE co-pending U.S. Appl. No. 62/343,615, filed May 31, 2016.

* cited by examiner

SYSTEM AND METHOD FOR MANIPULATION PLATFORM

CROSS-REFERENCE TO RELATED APPLICATIONS

This application is a continuation-in-part of U.S. patent application Ser. No. 14/473,241, filed on 29 Aug. 2014. This application claims priority to provisional U.S. patent application Ser. No. 62/343,615 filed on 31 May 2016. The entire disclosures of the foregoing are incorporated herein by reference.

BACKGROUND

There may sometimes be tasks that are inappropriate for performance by a person, and a manipulation system may be better suited for performing the tasks. It may be desirable to have a method and system for a manipulation platform that differs from those that are current available.

BRIEF DESCRIPTION

In one embodiment, a manipulation platform includes a navigation system, manipulation arm, and one or more area sensors. The manipulation arm extends, or is extendable from, the manipulation platform. Coupled to the manipulation arm may be a device that interacts with an item, or a collection sensor that collects information from a plurality of viewpoints or angles. The area sensors may acquire data representative of at least a portion of an area in which the manipulation platform is located. One or more processors operably couple with the navigation system, the manipulation arm, and the one or more area sensors. The processors may determine or predict a presence of an external object within a manipulation range of the manipulation arm using the data acquired by the one or more area sensors. The processors may respond to a determination of the external body being, or being predicted to be, within the manipulation range by controlling one or more of the manipulation arm or the manipulation platform. In response, the manipulation arm movement may be stopped, or controlled so that movement of the manipulation arm is maintained within a first modified, smaller manipulation range such that the external object is not present, or predicted to be present, within the modified, smaller manipulation range. Or, the navigation system may restrict movement of the manipulation platform so that such movement of the manipulation platform, and the manipulation arm coupled thereto, is maintained such that the external object is kept from being present, or predicted to be present, within a second modified, smaller manipulation range created by restricted movement of the manipulation platform.

In one embodiment, a manipulation platform includes a navigation system configured to move a manipulation platform; a visual recognition unit comprising at least one detector configured to acquire presence information within at least a portion of an area in which the manipulation platform is located; and a processing unit operably coupled to the navigation system and the visual recognition unit, the processing unit configured to: determine or predict a presence of an external object within at least one determined range of a manipulation arm coupled to the manipulation platform using the presence information from the visual recognition unit; and control the navigation system to implement at least one control action responsive to determining or predicting the presence of the external object within the determined range.

In one embodiment, a method provides for a manipulation platform having one or more extended or extendable manipulation arms. The method includes determining or predicting a presence of an external object within at least one determined range of the manipulation platform using presence information obtained using a recognition unit; determining at least one control action for the manipulation platform responsive to the determination or prediction of the presence in the range of the manipulation platform; and controlling at least one of a navigation system, or the manipulation arm of the manipulation platform, using the at least one control action.

DETAILED DESCRIPTION

Various embodiments provide methods and systems for manipulation platforms. Examples of manipulation platforms may include drones, robots, autonomous equipment and the like. These systems and methods may provide for detection of external objects (e.g., objects other than the manipulation platform, such as persons, other systems, devices, apparatuses, equipment, environmental features and the like) within one or more ranges or distances from a manipulation platform, and control of the manipulation platform based on the positions of one or more external objects within one or more ranges of the manipulation platform. The detection may be performed using one or more area sensors. Suitable area sensors may include optical sensors (e.g., two-dimensional camera, three-dimensional or stereo camera) or other detection devices (e.g., LIDAR) in conjunction with recognition software (e.g., software configured to detect the presence, distance, motion, and/or posture of external objects within the field of view of a camera or other detection device). These sensors may be mounted on the manipulation platform, or may be located within a determined distance thereto. At least one technical effect of various embodiments is the reduction or elimination of worksite accidents involving manipulation platforms.

Figure 1:
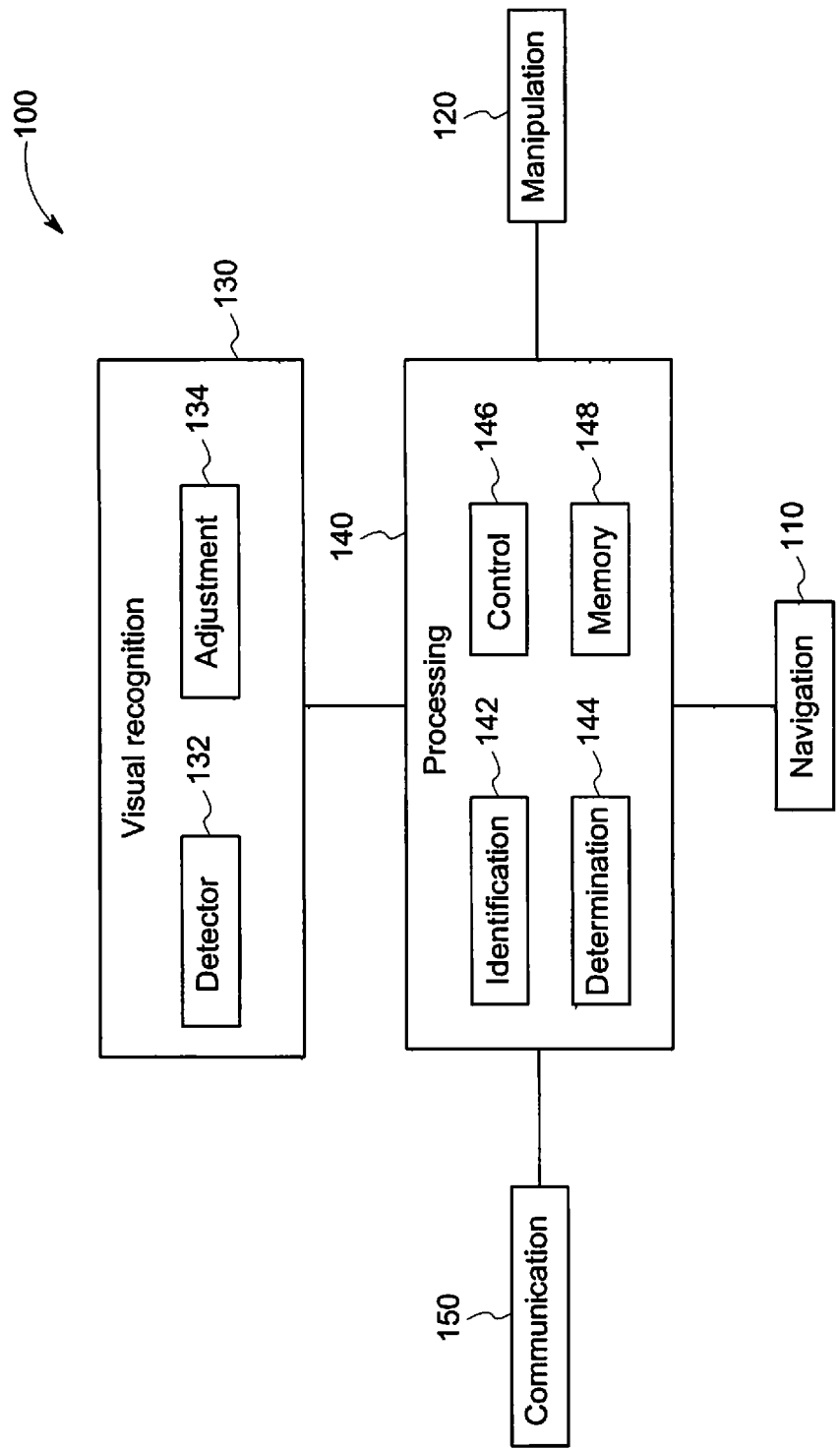
FIG. 1 is a schematic block diagram of a vehicle yard manipulation platform in accordance with various embodiments.

FIG. 1 is a schematic view of a manipulation platform 100 for use in a vehicle yard in accordance with various embodiments. A manipulation platform may be understood as a non-manned mobile device configured to perform one or more tasks autonomously, semi-autonomously, and/or via remote control. The depicted manipulation platform may perform one or more maintenance, repair, and/or inspection tasks on vehicles in a vehicle yard. For example, the manipulation platform may provide information (e.g., visual information) regarding the underside of a vehicle or other difficult to access area, for remote inspection (e.g., by an operator viewing a screen communicably coupled with an inspection camera of the manipulation platform). As another example, the manipulation platform may actuate brake levers, switches, couplings, or other mechanical features of a vehicle and/or vehicle yard. As one more example, the manipulation platform may transport heavy and/or awkward objects to or from a vehicle. While the example embodiments discussed herein are discussed in connection with vehicle yard applications, other environments may also be contemplated in alternate embodiments. For example, manipulation platforms for other areas for inspection or maintenance of other types of vehicles, such as trucks or ships, may be provided in various embodiments. While one example of a vehicle yard is a rail yard, not all embodiments of the inventive subject matter are limited to rail yards and rail vehicles. For example, one or more embodiments may be used in conjunction with manipulation platforms moving through repair facilities, parking lots, garages, etc., where multiple vehicles other than rail vehicles may be located.

The depicted manipulation system includes a navigation system 110, a manipulation arm 120, a visual recognition unit 130, a processing unit 140, and a communication unit 150. The navigation system may provide propulsion, location and mobility to the manipulation system. For example, the navigation system may move manipulation platform about an area within which the manipulation arm may perform one or more tasks. The manipulation arm may at least one of grasp items or provide an adjustable view for collection of information. The visual recognition unit may acquire presence information of humans (information from which the presence, distance, posture, and/or speed of humans may be determined) within at least a portion of the area within which the manipulation platform may perform one or more tasks.

The processing unit in the illustrated embodiment is disposed on-board the manipulation system, and is operably coupled to the navigation system, the manipulation arm, the visual recognition unit, and the communication unit. The depicted processing unit may determine a presence of an external object within at least one determined range of the manipulation system using presence information from the visual recognition unit (e.g., provided by the visual recognition unit to the processing unit or otherwise acquired or obtained by the processing unit). The processing unit of the illustrated embodiment is also configured to determine at least one control action for the manipulation system responsive to the determining the presence of the external object within the at least one determined range, and to control the navigation system and/or the manipulation platform to implement the at least one control action. The external object may be an obstacle, such as another manipulation platform, a system disposed in the yard, cargo disposed in the yard, etc., other than a vehicle. The external object may be a human or another system or device. In one embodiment, the external object may be an object whose presence is not previously determined or provided to the manipulation platform, such as a moving human or non-vehicular object.

A planned movement and/or performance of a task may be scheduled to be performed by the manipulation system. As the manipulation system begins to perform the task or movement, an external object may be detected within an operational range of the manipulation system. The operational range may be a distance that the manipulation system is capable of moving in one or more directions within a designated period of time (e.g., a few seconds or a time based on how quickly a human can move out of the way of the manipulation system), a distance that the manipulation system is capable of moving with an onboard power source, a distance that is a buffer zone in a direction of travel of the manipulation system, a distance within a range reachable by a manipulation platform's arm, or the like. Responsive to the detection of the external object, the task or movement may be altered. For example, the task or movement may be paused or halted until the external object is no longer within the operational range, or, as another example, the task or movement may be adjusted to avoid the external object. The position of the external object may be monitored on a continuous or on a periodic basis to control the manipulation system (e.g., control of the navigation system and/or the manipulation arm) to avoid contact with an external object (or to avoid proximity within a determined distance of an external object).

The depicted navigation system provides mobility to the manipulation system, for example a propulsion system may move the manipulation system about an area within which the manipulation platform may perform one or more tasks, while a location system guides such movements. Suitable navigation system propulsion, for example, may include one or more motors and/or wheels for propulsion, a steering mechanism, brakes, or the like. Other suitable propulsion systems may include legs, tracks, and articulated segments. Other suitable navigation systems may include propellers or rotors form moving the manipulation system through the air or water. The navigation system in the illustrated embodiment receives control signals or commands from the processing unit and/or a remote source to control propulsion (e.g., slowing down or speeding up), braking (e.g., slowing down or stopping), altitude (e.g., raising or lowering), and otherwise steering and orienting (e.g., turning or rotating) the manipulation system.

Figure 2:
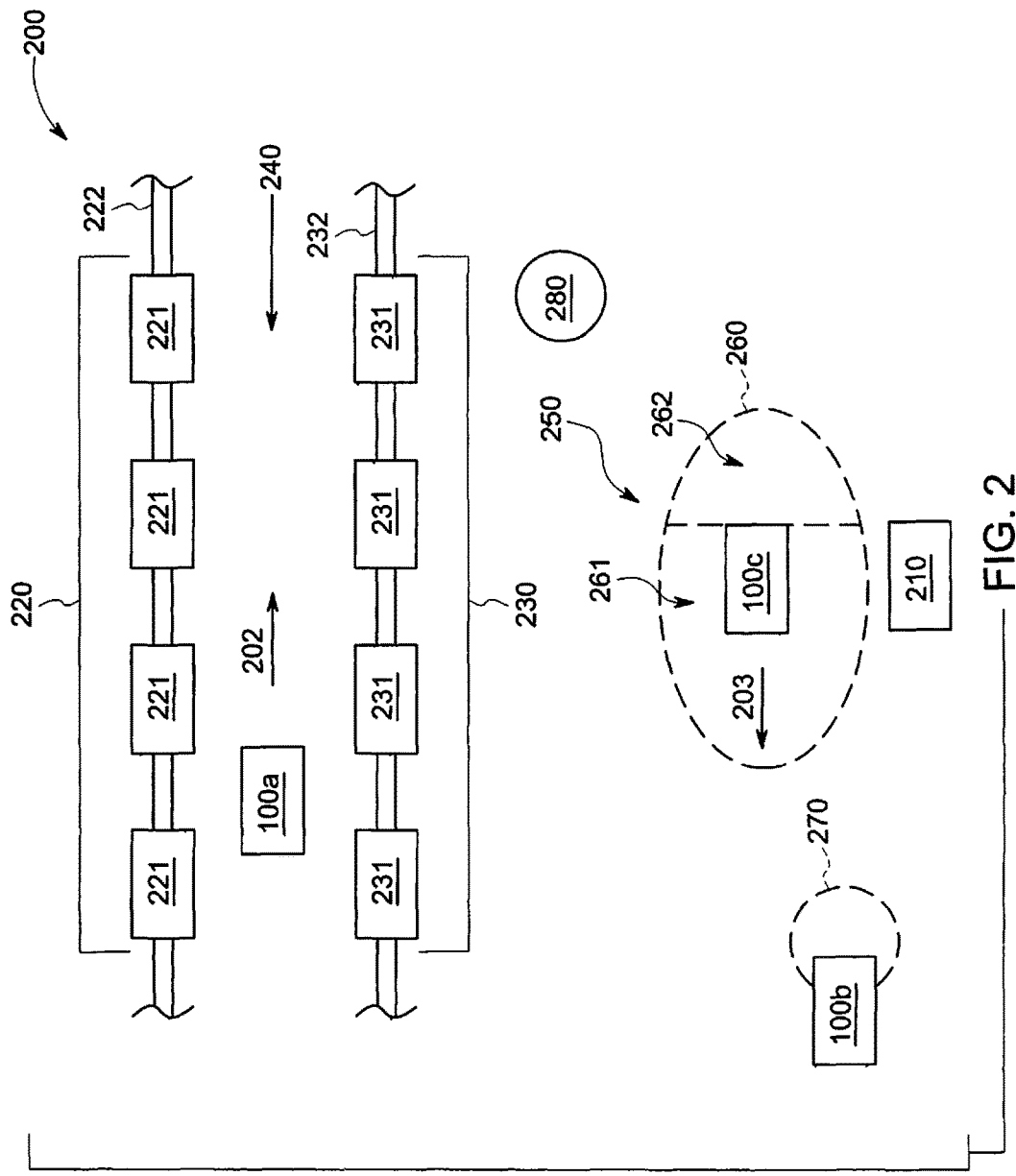
FIG. 2 is a schematic diagram of an area within which the vehicle yard manipulation platform of FIG. 1 may operate in accordance with various embodiments.

FIG. 2 provides an example of an area within which the manipulation system may navigate. FIG. 2 provides a schematic view of an area 200 (e.g., a vehicle yard or a portion thereof) within which one or more rail yard manipulation platforms (e.g., manipulation system) may operate in accordance with various embodiments. In the illustrated embodiment, three manipulation platforms (100a, 100b, and 100e) are deployed in the area but, alternatively, a single manipulation platform or a different number of manipulation platforms may be deployed in the area. The area includes a narrow area 240 and an open area 250. The narrow area includes one or more buildings, vehicles, or structures that form a confined area or otherwise impede freedom of movement therein. In the illustrated embodiment, the narrow area is shown as a narrow passage or corridor between two vehicles. As seen in FIG. 2, a first vehicle system 220 including a series of vehicles 221 (e.g., locomotives, automobiles, trucks, rail cars, truck trailers, etc.) is disposed on a first route 222 (e.g., a track, road, or the like). Also, a second vehicle system 330 including a series of vehicles 231 is disposed on a second route 232, with the second route extending about parallel to the first route. For example, the narrow area may be a corridor having a width between about 2.5 and 3.0 meters located between vehicles (e.g., first vehicle and second vehicle) and/or routes (e.g., first route and second route). By way of example, in some embodiments, the narrow area may have a width of less than 5 meters, less than 3 meters, or less than 2 meters (e.g., between routes). In some embodiments, the narrow area may be narrow enough that is impractical or impossible for two people to walk side-by-side in the narrow area. The narrow area may be sized in some embodiments such that it is impractical or difficult for a human to walk around a manipulation system disposed within the narrow area. In some embodiments, the narrow area may have a width that is less than twice a width of the manipulation system, or less than three times a width of the manipulation system, among others. The open area, on the other hand, may be located in a less confined or more open portion of the area. In the illustrated embodiment, a given manipulation platform may travel from base through open area to get to narrow area where the manipulation platform may perform inspection and/or maintenance tasks, for example, on the vehicle units.

The vehicles that make up the vehicle systems may represent separate vehicles that are mechanically and/or logically coupled with each other for travel together along one or more routes. For example, the vehicles in a vehicle may be mechanically coupled with each other by couplers or couplings. As another example, the vehicles in a vehicle system may not be mechanically coupled, but may be logically coupled by the vehicles communicating with each other so that the vehicles travel together along a route (e.g., such as in a platoon arrangement). A vehicle system may include multiple vehicles, or may include a single vehicle.

Different control strategies may be employed for controlling the manipulation platforms 100a, 100b, 100c depending on whether the manipulation platforms are in the open area or the narrow area. For example, a more restrictive or less permissive control strategy may be employed in the narrow area, and a less restrictive or more permissive control strategy may be employed in the open area. For instance, if manipulation system "a" (in the narrow area) traveling in direction of travel 202 determines an external object is within a buffer zone, the manipulation system "a" may be controlled to stop until the external object is no longer within the buffer zone. However, if manipulation system "c" (in the open area) traveling in direction of travel 203 determines an external object is within a buffer zone, the manipulation system "c" may continue traveling but travel in a different path than originally planned to keep the external object out of the buffer zone of manipulation system "c".

In the illustrated embodiment, manipulation system "a" is travelling in direction of travel 202 in the narrow area, manipulation system "b" is stationary (e.g., performing a manipulation task) in the open area, and manipulation system "c" is travelling in another direction of travel 203 in the open area. Control actions for the manipulation platforms 100a, 100b, 100c may be determined based on one or more zones corresponding to operational modes (e.g., navigation mode or mobile mode where manipulation platform is moving or about to move, or manipulation mode where manipulation platform is moving a manipulation device such as an arm or about to move the manipulation device) and/or location (e.g., within open area or within narrow area). Before commencing travel to be accomplished using a navigation system (e.g., navigation system) and/or a task to be performed with a manipulation arm (e.g., the manipulation arm), a manipulation platform may determine if an external object (e.g., a human) is within a given zone, and adjust a control plan accordingly. If the external object is detected to be moving, then a predictive module anticipates a route (or possible routes) as well as the timing, speed and any acceleration or deceleration. If the anticipated route travels through the manipulation arm's zone of movement, the module reacts. The reactive action may include, for example, one or more of retracting the manipulation arm to avoid or control an intersection or collision of the external object with the manipulation arm, or moving the manipulation platform itself, alerting of the potential or impending collision, or the like.

For example, as seen in FIG. 2, the manipulation system "c" is traveling in the open area. A buffer zone may be employed when a manipulation platform is traveling or about to travel (e.g., when the manipulation platform is in navigation or mobile mode). In the illustrated embodiment, a buffer zone 260 surrounds the manipulation system "c". The depicted buffer zone 260 includes a first buffer zone 261 disposed laterally and forward of the manipulation system "c", and a second buffer zone 262 disposed behind the manipulation system "c" (relative to the direction of travel). It may be noted that the buffer zone 260 is illustrated as about uniformly disposed about the manipulation system, but may be shaped or positioned otherwise in various embodiments. For example, the buffer zone may be limited to a forward portion oriented toward a direction of travel (e.g., first buffer zone) in various embodiments, and may extend farther in the direction of travel than in lateral directions. The buffer zone may provide the manipulation platform with adequate time to detect an external object and avoid the external object when traveling. Further, the buffer zone may be dynamically adjustable, for example to provide a larger buffer zone when traveling at higher speeds and a smaller buffer zone when traveling at lower speeds.

As another example, a first, larger buffer zone may be used when the manipulation platform is in the open area, and a second, smaller buffer zone may be used when the manipulation platform is in the narrow area. Further still, in some embodiments, multiple buffer zones may be contemporaneously employed. For example, a first, larger buffer zone may be utilized, with an auditory alarm, message, or other signal provided to warn external objects detected in the larger buffer zone of the presence of the manipulation platform, and a second, smaller buffer zone may be utilized, with control of the manipulation platform altered when an external object is detected in the second, smaller buffer zone. As another example, a first, larger buffer zone may be provided with a first less restrictive control action (e.g., steering to avoid an external object and/or slowing down) implemented when an external object is detected in the first, larger buffer zone, and a second, smaller buffer zone may be provided with a more restrictive control action (e.g., stopping the manipulation platform, or slowing down by a greater amount than for the first, larger buffer zone) when an external object is detected in the second, smaller buffer zone. As one more example, a warning may be provided when an external object is in a first, larger buffer zone, a more restrictive control may be implemented when an external object is in a second, smaller buffer zone, and a less restrictive control may be implemented when an external object is in a third, intermediately sized buffer zone.

Another example of a zone for which a control action of a manipulation platform may be altered when an external object is detected within the zone is a manipulation zone. The manipulation zone may be utilized, for example, when the manipulation platform is in a manipulation operational mode, or is stationary and performing (or about to perform) a task involving movement of the manipulation arm (e.g., manipulation arm). For example, if an external object is detected within the manipulation zone, movement of the manipulation arm may be stopped until the external object is outside of the manipulation zone (or a movement planned to occur may be postponed until the external object is outside of the manipulation zone). As another example, if an external object is detected within a specific portion of the manipulation zone, the manipulation arm may be operated to only reach other portions of the manipulation zone but not the specific portion for which an external object has been detected. As with the buffer zone for navigation operation of the manipulation platform, the presence of the external object may be monitored in an ongoing fashion, and the control action of the manipulation platform updated appropriately (e.g., avoid movement of manipulation arm when an external object is within zone, resume movement of manipulation arm when an external object is outside of zone). In the illustrated embodiment, a spherical manipulation zone 270 is shown for the manipulation system. The manipulation zone may have a radius corresponding to a maximum or upper limit on a reach of a manipulation arm. The manipulation zone may be sized to include all possible positions of the arm or other manipulation arm, or so that the manipulation arm may not reach beyond the manipulation zone. In various embodiments, the manipulation zone may not be circular or spherical. For example, the manipulation zone may only cover or correspond to a current position of a manipulation arm as well as any planned positions of the manipulation arm for a task about to be performed (or being currently performed). For manipulation platforms having plural manipulation arms, plural corresponding manipulation zones may be defined for each manipulation arm. Further, similar to the discussion regarding the buffer zone above, warning zones and/or zones for different levels of restriction on movement may be employed for manipulation zones.

The information used by the manipulation platforms to determine if an external object is present within a given zone may be obtained using one or more visual recognition units (e.g., visual recognition unit) disposed on-board the manipulation platform. In some embodiments, information obtained on-board may be supplemented and/or replaced with information from off-board sources. For example, in the illustrated embodiment, an off-board visual recognition unit 280 (e.g., a camera or LIDAR detector mounted on a post or other structure) may provide information on the location of external objects within a field of view of the off-board visual recognition unit. For example, the off-board visual recognition unit may be directed to focus on all or a portion of the narrow area to provide information corresponding to any external objects within the narrow area. Alternatively, or additionally, other manipulation platforms may be used as off-board information sources. For example, when a manipulation platform detects an external object within a given zone, the manipulation platform may communicate information regarding the detection of the human as well as the position of the detecting manipulation platform (and/or location of zone with respect to the location of the detecting manipulation platform). Further still, in some embodiments, directional information may be provided. For example, information regarding both the position and the direction of a movement of a mobile external object may be communicated between other manipulation platforms and/or other off-board sources. Thus, in some embodiments, information regarding humans not located within a field of view of an on-board visual recognition unit may help alert a manipulation platform to an approaching external object, to supplement information obtained from an on-board source, and/or to confirm or check information from an on-board source.

Returning to FIG. 1, the depicted manipulation arm includes a device that may grasp items and/or a collection sensor that may provide an adjustable viewpoint for collection of information. For example, the manipulation arm device may include one or more arms, hinges, linkages, or other mechanisms to control the position of one or more grippers, holders, cutters, torches, projectile launcher, or the like for manipulating objects. The collection sensor may be a camera, or other device, that senses one or more physical, electrical, chemical, or radiological aspect of the object.

In various embodiments, the manipulation arm may include one or more motors, gears, cylinders, or the like to actuate a mechanism such as an arm based on control signals or commands provided by the processing unit. A suitable manipulation arm may be hydraulically, electrically, or otherwise actuated. For example, the manipulation arm may grasp and manipulate an item, for example to release a brake, actuate a switch, secure (or release) a latch or fastener, position and hold a part or tool for use in maintenance and inspection of a vehicle, load a part or tool to be transported on to the manipulation system (or off-load the tool or part from the manipulation system), or the like.

Alternatively, or additionally, the manipulation arm may position a collection sensor device used to collect information. For example, the manipulation arm may position an inspection camera in a difficult to reach area (e.g., underneath a vehicle), with information from the camera used for inspection or diagnostic purposes. The manipulation system may transmit information from an inspection camera positioned by the manipulation arm to an off-board recipient for review and analysis of a portion of a vehicle viewed by the inspection camera.

The visual recognition unit of the illustrated embodiment may acquire presence information (i.e., information describing, depicting, or otherwise corresponding to the presence, location, or vector of an external object) within, or toward, at least a portion of an area within which the manipulation system may travel. The visual recognition unit includes at least one detector 132 configured to acquire presence information. Suitable detectors may include one or more of a 2-D detector (e.g., 2-D camera, an RGB camera, etc.) or a 3-D detector (e.g., RGBD camera, stereo camera, LIDAR detector, a structured light sensor, etc.).

The visual recognition unit may include more than one detector. The visual recognition unit is depicted as a single block in FIG. 1, but may include portions or aspects mounted at different locations on the manipulation system and may include more than one physically distinct structures. For visual recognition units including more than one detectors, the detectors may be commonly mounted at a shared position, or may be mounted at different positions on the manipulation system (e.g., one detector mounted at a first position and one detector mounted at a second, different position). For example, one detector may be mounted to a mast or other structure dedicated to mounting and/or supporting the detector, while a different detector may be mounted to an arm of the manipulation arm. In the illustrated embodiment, the visual recognition unit includes an adjustment unit 134 operably coupled to the detector and adjust the position, focus, and/or aim of the detector. For example, the adjustment unit may provide pan-and-tilt capability to increase the effective field of view of the detector and/or to provide for improved focus or study of an object of interest (e.g., a potential human or other external object) within a field of view of the detector.

In various embodiments, the detector may be used in conjunction with recognition software that determines presence of external objects based on images or other information provided by the detector. The software may be stored on or used in connection with the processing unit. Alternatively, or additionally, recognition software may be stored on or used in connection with a computer or processor forming a part of the visual recognition unit, with the presence of a detected external object communicated from the visual recognition unit to the processing unit. The recognition software may also be utilized to determine posture and/or movement of the external object (e.g., a person) over time.

The field of view for a given detector of the visual recognition unit may be the same as a zone (e.g., a buffer zone), or may be a portion of a zone (e.g., with one or more other detectors providing information on the rest of the zone, or with the detector panned, tilted, or otherwise moved to provide a larger effective field of view). In some embodiments, the field of view of a given detector may be larger than a zone (e.g., buffer zone). In addition to being used to determine if an external object is present with one or more zones for use in determining control actions of the manipulation system, information from one or more detectors of the visual recognition unit may determine if the manipulation platform is located in a confined space or not (e.g., to determine if the manipulation platform is located in the narrow area or the open area). Further, information from a detector of the visual recognition unit (e.g., from a camera mounted on a manipulation arm) may also be used for diagnostic or inspection purposes of a portion of a vehicle within a field of view of the detector.

In some embodiments, additional detectors (e.g., in addition to any cameras and/or LIDAR detectors of the visual recognition unit) may be disposed on and/or employed by the manipulation system. For example, sonar and/or proximity sensors may detect stationary objects such as walls, posts, or other structures, with the detector of the visual recognition unit used to identify humans.

It may be noted that in some embodiments, a given detector may be dedicated to a particular sub-system or portion of the manipulation system (e.g., dedicated for use only with the navigation system and/or in the navigation mode, dedicated for use only with the manipulation arm and/or in the manipulation mode). In other embodiments, one or more detectors of the visual recognition unit may be shared among modes and/or subsystems or portions. For example, for a given mode or sub-system, a first detector may be a primary detector with a second detector used to supplement, confirm, or check information from the first detector. Optionally, the second detector may be a primary detector for a different mode or sub-system, with the first detector used as a supplemental detector for the different mode or sub-system. In some embodiments, a first detector may be utilized to provide a first field of view for one size zone, and a second detector used to provide a differently sized second field of view for differently sized zone.

The depicted processing unit may determine a presence of an external object within at least one determined range (e.g., buffer zone, manipulation zone) of the manipulation system using presence information from the visual recognition unit. The presence information may include images or other representations of the environment of the manipulation system used by the processing unit to determine if an external object is present, or may include an indication from the visual recognition unit that an external object has been detected in a given zone and/or field of view. The processing unit of the illustrated embodiment is also configured to determine at least one control action responsive to determining the presence of the external object within the at least one determined range, and to control at least one of the navigation system or the manipulation arm to implement the at least one control action. For example, a pre-planned activity (e.g., an activity previously planned by the processing unit or other source for performance by the manipulation system) may be altered to account for the detection of a worker within a zone. For example, when an external object is detected in a given zone, a previously planned activity by the manipulation platform may be stopped or otherwise modified to avoid the detected external object. In some embodiments, for example, the processing unit may receive and use information from a first detector to determine if an external object is present in a buffer zone, and, if so, to determine a navigation control action to avoid the external object. The processing unit may receive and use information from a second detector to determine if an external object is present in a manipulation zone, and, if so, to determine a manipulation control action to avoid the external object. In other embodiments, information from two or more detectors may be used in connection with each other to determine a given control action.

The depicted processing unit is operably coupled to the navigation system, the manipulation arm, the visual recognition unit, and the communication unit. The processing unit, for example, may receive information from the visual recognition unit and/or communication unit from which the processing unit determines if an external object is present and, if so, determine appropriate control actions to provide for the safety of the external object (e.g., to stop or modify a given movement or action by the manipulation system to avoid contact with the external object, or to stay beyond a certain distance of the external object). The processing unit may then provide a control signal or command to the navigation system and/or the manipulation arm to implement the determined appropriate control action or actions. The processing unit may include processing circuitry configured to perform one or more tasks, functions, or steps discussed herein. It may be noted that "processing unit" as used herein is not intended to necessarily be limited to a single processor or computer. For example, the processing unit may include multiple processors and/or computers, which may be integrated in a common housing or unit, or which may be distributed among various units or housings.

Returning to FIG. 1, in the illustrated embodiment, the processing unit includes an identification module 142, a determination module 144, a control module 146, and memory 148. The particular units or modules shown in FIG. 1 are only examples, and other arrangements of units or sub-units of the processing unit may be employed based on application specific requirements and parameters. The various aspects of the processing unit may act individually with other aspects to perform one or more aspects of the methods, steps, or processes discussed herein. Alternatively, the aspects may work cooperatively should the application benefit.

The depicted identification module receives or otherwise obtains presence information from the visual recognition unit and identifies if an external object is within one or more zones, such as buffer and/or manipulation zones. In some embodiments, the identification module may obtain images or imaging information from one or more cameras and/or LIDAR detectors of the visual recognition unit. The identification module may have software loaded thereon or otherwise have access to software that identifies external objects from imaging information. In addition to the presence of the external object, the location of the external object within the field of view and/or zone of interest may be determined, as well as posture, for example. Further, by obtaining imaging information over time, movement of the external object and/or trends in the movement of the external object may be determined. In some embodiments, the visual recognition unit may have recognition software stored thereon or have access thereto, with the visual recognition unit determining if an external object is present in one or more images, and providing information to the identification module describing the presence and location of any detected external objects. The identification module may then identify any zones of interest (e.g., buffer zones and/or manipulation zones) that have an external object present.

The depicted determination module receives or otherwise obtains information from the identification module describing the presence of one or more external objects in one or more zones of interest. The determination module determines if a control plan of the manipulation system should be altered due to the presence of one or more external objects, and determines the appropriate control actions to prevent the manipulation system from contacting the external object. In some embodiments, the determination module may determine what mode of operation (e.g., navigation mode or manipulation mode) the manipulation platform is currently in, and/or a location of the manipulation platform (e.g., within the narrow area or the open area), and determine the control action (or actions) based at least in part on the mode of operation and/or location of the manipulation system.

For example, in some embodiments, the determination module (and/or other aspect of the processing unit) may determine if the manipulation system is in the narrow area or in the open area. The processing unit (e.g., determination module) may then determine at least one control action using a first strategy if the manipulation system is in the narrow area, or to determine at least one control action (e.g., a different control action, such as a less restrictive or more permissive control action) using a second strategy if the manipulation system is in the open area. Thus, for example, in some embodiments, a more permissive and time saving avoidance strategy (e.g., a strategy in which the manipulation system keeps moving but modifies a direction or speed of movement to avoid the external object) may be employed in open areas, while a more restrictive strategy (e.g., stopping the manipulation system until the external object is out of the zone of interest) may be employed to ensure safety in tight quarters where an avoidance strategy may be overly risky or otherwise not practicable.

The processing unit may employ a "stop and wait" strategy when the manipulation system is in the narrow area. For example, the processing unit may control the navigation system to maintain the manipulation system in a stationary position when the manipulation system is in the narrow area and an external object is detected within a buffer zone. On the other hand, the processing unit may employ an "avoidance" strategy when the manipulation system is in the open area. For example, the processing unit may control the navigation system to avoid an external object (e.g., slow down and/or steer to change direction) when the manipulation system is in the open area and the external object is detected within a buffer zone.

The processing unit may also determine control actions for when the manipulation system is in the manipulation zone (e.g., the manipulation system is stationary and moving the manipulation arm or about to commence movement of the manipulation arm). For example, the processing unit may maintain the manipulation arm in a stationary position when an external object is detected within a manipulation zone. The manipulation zone may be defined or determined by the maximum range of an arm of the manipulation arm. For example, the workspace of an arm (either maximum workspace, or workspace required by a current manipulation operation) may define a danger zone. When all or a portion (e.g., arm) of the manipulation arm is in motion, any activity detected within the danger zone may result in the stoppage of the manipulation activity or task until the external object is beyond the danger zone. On-board stereo cameras and/or LIDAR detectors of the visual recognition unit may be used by the processing unit to detect and estimate the position of any external object within the field of view of the cameras and/or LIDAR detectors. The manipulation system may also include a flashing light and/or audible messages or alarms that are activated to indicate when the manipulation system and/or the manipulation arm are in motion. In some embodiments, the lights, alarms, or messages may intensify in brightness, loudness, frequency or otherwise when a person approaches the danger zone closely but does not enter the danger zone. For example, a first alarm may be provided when the manipulation system is in motion, and a second, more intense alarm may be provided when the manipulation system is in motion and a human is near a buffer and/or manipulation zone. Further still, an additional alarm or message may be provided when the manipulation system has stopped either a navigation activity or a manipulation activity due to the presence of a human, thereby alerting the human and prompting the human to move outside of the zone of interest.

The control module 146 of the illustrated embodiment receives or otherwise obtains control information (e.g., one or more control actions determined by the determination module) from the determination module, formulates a control command or commands, and provides the control command or commands to the navigation system and/or the manipulation arm for implementation, as appropriate. The control command may be a command to stop or slow down, to steer in a new direction to avoid an external object, to speed up (e.g., return to a previously planned speed when an external object leaves a buffer zone), or the like. The control module 146 may also provide control commands pursuant to a pre-planned course of action when no external object is detected in a zone of interest.

The communication unit may provide information from the manipulation system to other manipulation platforms, a base, (e.g., base 210), or other off-board recipient, and to receive information from off-board sources such as other manipulation platforms, a base, one or more stationary visual recognition units, or the like. For example, the communication unit may communicate the presence and location of external object detected by the manipulation system to a base, central dispatch, or planning center, or to other manipulation platforms, among others. Further, the communication unit may receive information describing the position and/or motion (e.g., speed and direction) of external object detected via stationary visual recognition units and/or other manipulation platforms. The communication unit may include or be coupled to an antenna for transmitting and/or receiving messages.

Figure 3:
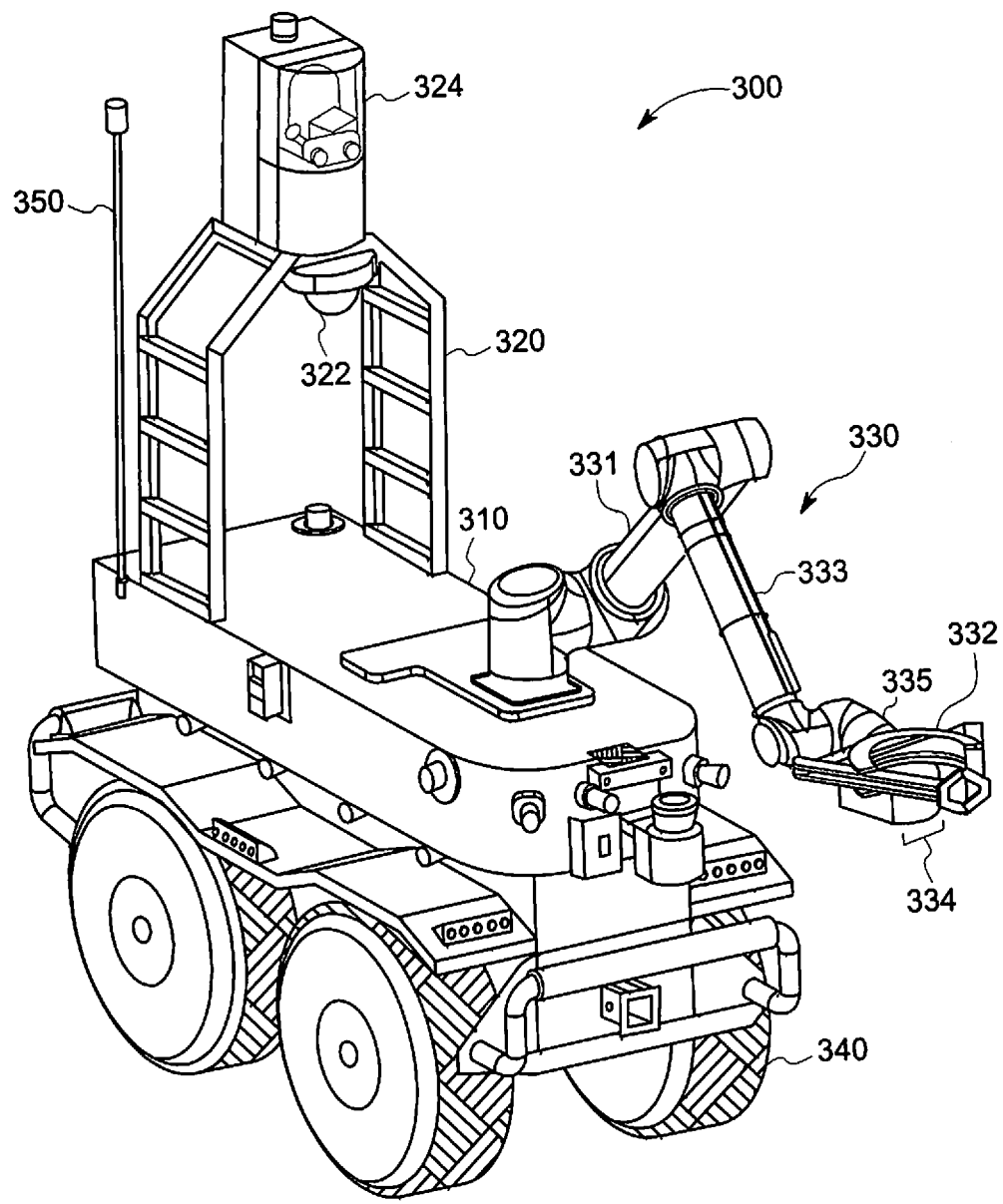
FIG. 3 is a perspective view of a vehicle yard manipulation platform in accordance with various embodiments.

FIG. 3 provides a perspective view of a manipulation platform 300 formed in accordance with various embodiments. The manipulation platform may be configured for use as a vehicle yard manipulation platform. The manipulation platform may include one or more aspects similar to the manipulation system discussed in connection with FIG. 1. The depicted manipulation platform includes a body 310 and a mast 320. The body may house one or more processors (e.g., one or more processors that form all or a portion of the processing unit). The body may provide for the mounting of other components and/or sub-systems.

In the illustrated embodiment, the mast mounts to the body. The mast may provide a mounting of a first visual detector 324 (e.g., stereo camera or LIDAR detector) and adjustment unit 322 for the first visual detector. The field of view of the first visual detector 324 may be adjusted via the adjustment unit, which may include a motor or other device for moving the first visual detector (e.g., to one or more of rotate, pan, or tilt the first visual detector).

The articulated arm 330 provides an example of a manipulation arm, and includes plural jointed sections 331, 333, 335 interposed between a gripper 332 and the body 310. The articulated arm 330 may be actuated to control the positioning and usage of the gripper 332, as well as the positioning of a second visual detector 334 (e.g., stereo camera or LIDAR detector). The gripper may be configured to one or more of grasp a brake lever for actuation, release, or testing of the brake; to manipulate a switch; to grasp and hold tools for use on a vehicle and/or components for installation to or removal from the vehicle; or the like. The first visual detector and the second visual detector provide examples of separately mounted detectors of a visual recognition unit. Information from one or more detectors of the visual recognition unit may be used for further purposes or tasks in addition to detection of external objects. For example, the second visual detector may provide a view of the surroundings of the gripper. For example, the second visual detector may provide a view of an underside of a vehicle for inspection or diagnostic purposes.

The depicted manipulation platform includes wheels 340 that are driven by a motor and/or steered to move the manipulation platform about an area when the manipulation platform is in a navigation mode and is moving. Tracks, legs, propellers or other mechanisms may propel or move the manipulation platform depending on the configuration and intended use. In the illustrated embodiment, the antenna 350 used to communicate with a base, stationary visual detectors, other manipulation platforms, or the like.

Thus, in various embodiments, systems and/or methods are provided that improve vehicle yard safety, while still providing for efficient control of manipulation platforms to perform inspection and/or maintenance tasks. Using visual information obtained via on-board and/or off-board systems, manipulation platforms may be controlled to avoid contact with external objects such as humans. The particular control strategies employed may be tailored for the mode of operation (e.g., navigation and/or manipulation) under which the manipulation platform is operating and/or an area (e.g., confined or open) in which the manipulation platform is located.

Figure 4:
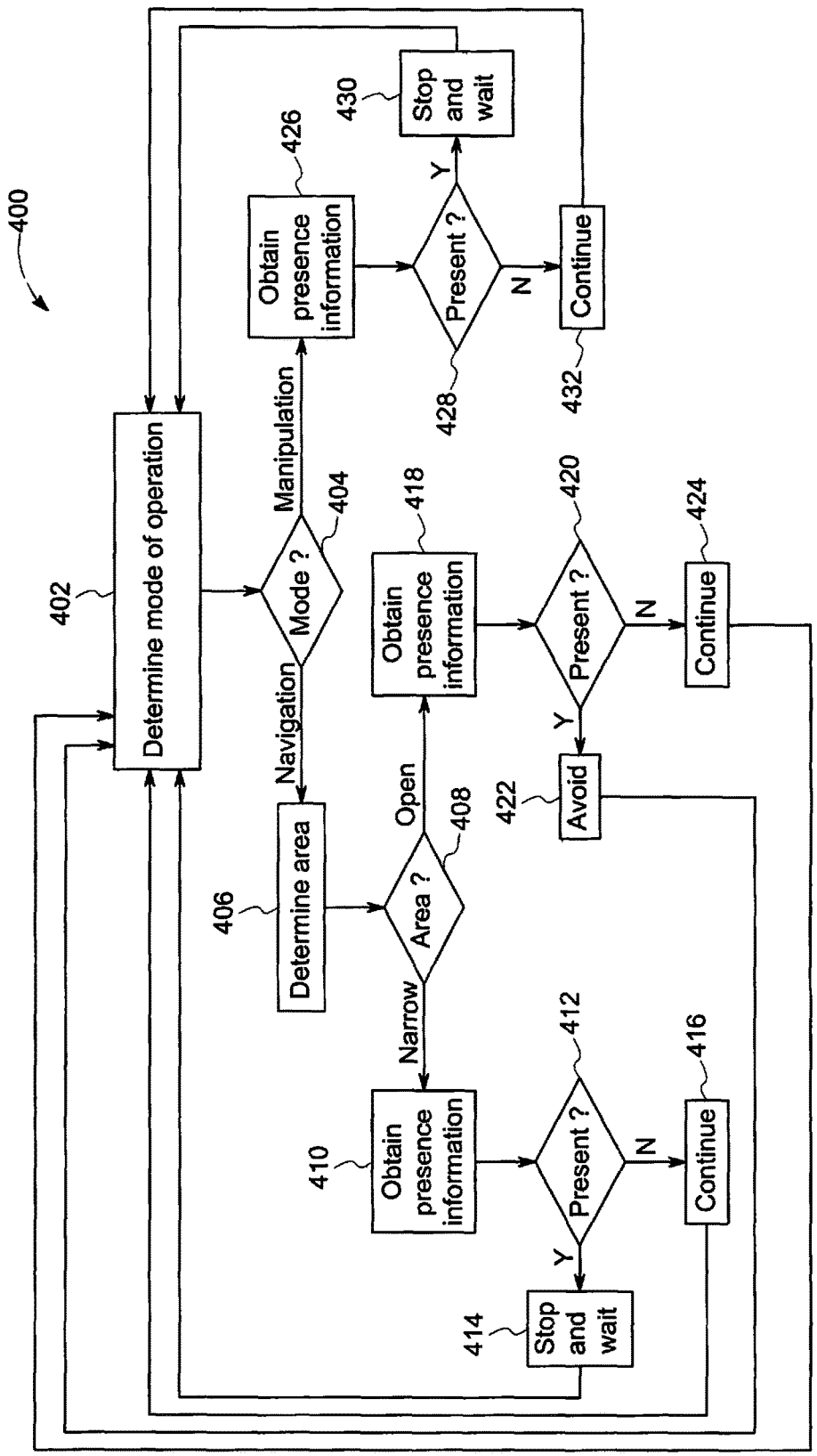
FIG. 4 is a flowchart of a method for controlling a vehicle yard manipulation platform in accordance with various embodiments.

FIG. 4 provides a flowchart of a method 400 for controlling a manipulation platform, for example a manipulation platform for use in a vehicle yard. In various embodiments, the method 400, for example, may employ structures or aspects of various embodiments (e.g., systems and/or methods) discussed herein. In various embodiments, certain steps may be omitted or added, certain steps may be combined, certain steps may be performed simultaneously, certain steps may be performed concurrently, certain steps may be split into multiple steps, certain steps may be performed in a different order, or certain steps or series of steps may be re-performed in an iterative fashion. In various embodiments, portions, aspects, and/or variations of the method may be able to be used as one or more algorithms to direct hardware to perform operations described herein.

At step 402, a mode of operation is determined. For example, one or more processors (e.g., processing unit) disposed on-board a manipulation platform may determine what process or task a manipulation platform is currently performing, or is about to perform. A manipulation platform that is travelling from one area to another, or about to commence such travel, may be understood as operating in a navigation mode. A manipulation platform that is performing a task with a manipulation arm and gripper, for example, or about to commence such performance of a task, may be operating in a manipulation mode.

At step 404, if the mode of operation is determined to be a navigation mode, the method 400 proceeds to 406. If the mode of operation is determined to be a manipulation mode, the method proceeds to 426.

At step 406, the area within which the manipulation platform is located is determined. For example, a vehicle yard in which the manipulation platform may operate may have areas of different types. For instance, an area between parked trains or consists, or otherwise confined, may be identified as a narrow or confined area. Such areas may not provide sufficient room for a manipulation platform to maneuver around a human or other obstacle in the path of the manipulation platform (or in the path of a manipulation arm of the manipulation platform). Other areas may be more open and provide additional room for a manipulation platform to maneuver around a human or other obstacle. The determination of area may be based on one or more of visual information (e.g., collected by a camera or LIDAR), sonar information (e.g., used to locate walls or other structures), positioning information (e.g., information from a global positioning system based on-board the manipulation platform and compared to a determined map of identified locations), among others. Other types or classification of areas (or gradations between levels of narrowness or openness) may be used in various embodiments. For example, in some embodiments three areas may be utilized: an open area for which a first relatively permissive control strategy (e.g., maintain speed but steer to avoid the external object) is employed, a narrow area for which a second relatively restrictive control strategy (e.g., stop and wait until the external object is out of buffer zone) is employed, and an intermediate area for which an intermediate control strategy (e.g., slow down and steer to avoid the external object) is employed.

At step 408, if the area is determined to be a narrow area, the method proceeds to step 410. If the area is determined to be an open area the method proceeds to step 418.

At step 410, presence information is obtained, for example by one or more processors disposed on-board the manipulation platform. The presence information may correspond to one or more buffer zones corresponding to a desired distance to be maintained between a moving manipulation platform and any external objects. The size of a buffer zone may be selected to provide sufficient time for a human to avoid a manipulation platform, or for a manipulation platform to stop and/or steer to avoid a detected external object. The presence information is obtained from one or more visual detectors (e.g., the detector, first visual detector, second visual detector), such as a camera or LIDAR detector. In various embodiments, the one or more visual detectors may be disposed on the manipulation platform and/or disposed off-board. In some embodiments, a particular visual detector may be dedicated for use in providing visual information used in conjunction with a particular mode (e.g., navigation, manipulation). The presence information may be in the form of images or imaging information from which on-board processors may determine if an external object is present (e.g., using human recognition software), or, in some embodiments, may include a message describing the position, motion, and/or posture of any external objects located within a field of view and/or a zone of interest (e.g., buffer zone).

At step 412, if it is determined that an external object is present (e.g., within a buffer zone surrounding at least a portion of the manipulation platform), the method proceeds to step 414. If it is determined that no external object is present in the buffer zone, the method proceeds to step 416.

At step 414, with an external object in the buffer zone and the manipulation platform in a narrow area, the manipulation platform is controlled to stop and wait until the external object has left the buffer zone. An alarm or other message may be provided by the manipulation platform to alert the external object that the manipulation platform has stopped due to the presence of the external object, and/or to prompt or request the external object to move an additional distance away from the manipulation platform. Additional presence information may be obtained at subsequent times from visual detectors to monitor the presence of the external object in an ongoing fashion.

At step 416, with no external object in the buffer zone, the manipulation platform may continue any current or planned traversal across the area. As shown in FIG. 4, in the illustrated embodiment, as long as the manipulation platform is operational, the method 400 may continue to monitor the mode and location of the manipulation platform as well as the presence of any external objects. It may be noted that the order or arrangement of steps may vary in different embodiments. In various embodiments, for example, the method may continue after step 414 and/or 416 by proceeding to steps 406 or 410 instead of step 402 in certain circumstances. When the manipulation platform is at rest or not in the vehicle yard, the monitoring of mode, location, or the like may be put into a hold or stand-by mode, and resumed when the manipulation platform resumes operation.

At step 418, with the manipulation platform determined to be operating in navigation mode in an open area, presence information is obtained, similar to the obtaining of presence information at step 410. For example, imaging information corresponding to the presence or absence of external objects within a buffer zone may be obtained from one or more visual detectors (e.g., on-board visual detectors).

At step 420, if an external object is determined to be present within the buffer zone, the method proceeds to step 422. If an external object is determined not to be present within the buffer zone, the method proceeds to step 424.

At step 422, with an external object in the buffer zone and the manipulation platform in an open area, the manipulation platform is controlled to continue moving but to alter a previously planned course of travel to avoid the external object. For example, the manipulation platform may steer to a new direction to avoid the external object, and continue monitoring the presence of the external object to confirm that the new path will avoid the external object (and to modify the new path to avoid the external object if not). An alarm or other message may be provided by the manipulation platform to alert the external object that the manipulation platform is travelling near the external object, and/or to prompt or advise the external object to the newly planned course to be taken by the manipulation platform. Additional presence information may be obtained at subsequent times from visual detectors to monitor the presence of the external object in an ongoing fashion.

At step 424, with no external object in the buffer zone, the manipulation platform may continue any current or planned traversal across the area.

At step 426, with the manipulation platform determined to be in the manipulation mode, presence information is obtained, for example by one or more processors disposed on-board the manipulation platform. The presence information may correspond to a manipulation zone corresponding to a range of a manipulation arm. For example, the manipulation zone may be circular and have a radius corresponding to a maximum reach of a manipulation arm (e.g., the radius of the manipulation arm plus a safety factor). As another example, the manipulation zone may be defined only in a direction or directions of planned travel of the manipulation arm, so that the manipulation zone only includes areas that may be in the path of the manipulation arm. The presence information is obtained from one or more visual detectors (e.g., detector, first visual detector, second visual detector), such as a camera or LIDAR detector. In various embodiments, the one or more visual detectors may be disposed on-board the manipulation platform and/or disposed off-board the manipulation platform. In some embodiments, a particular visual detector may be dedicated for use in providing visual information used in conjunction with a particular mode (e.g., navigation, manipulation). The presence information may be in the form of images or imaging information from which on-board processors may determine if an external object is present (e.g., using recognition software), or, in some embodiments, may include a message describing the position, motion, and/or posture of any external objects located within a field of view and/or a zone of interest (e.g., manipulation zone).

At step 428, it is determined if any external objects are present within the manipulation zone. If an external object is present in the manipulation zone, the method proceeds to step 430, but if no external object is determined present in the manipulation zone, the method proceeds to step 432.

At step 430, a current or upcoming motion of the manipulation arm is paused or stopped due to the presence of an external object in the manipulation zone. Presence information may be acquired and analyzed over time to monitor the presence of the external object, and the motion of the manipulation arm may resume when the external object is no longer in the manipulation zone. In other embodiments, the manipulation arm may be slowed and/or steered to avoid an external object, for example, based on a determined position, posture, and speed of the external object, with the position, posture, and speed monitored on an ongoing basis to adjust the path and/or speed of the manipulation arm as appropriate. At step 432, with no external object in the manipulation zone, the manipulation platform may continue any current or planned movement of the manipulation arm.

Various embodiments should be read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors, controllers or memories) may be implemented in a single piece of hardware (e.g., a signal processor or random access memory, hard disk, or the like) or multiple pieces of hardware. Similarly, any programs may be stand-alone programs, may be incorporated as subroutines in an operating system, may be functions in an installed software package, and the like. The various embodiments are not limited to the arrangements and instrumentality shown in the drawings.

As used herein, the terms "system," "unit," or "module" may include a hardware and/or software system that operates to perform one or more functions. For example, a module, unit, or system may include a computer processor, controller, or other logic-based device that performs operations based on instructions stored on a tangible and non-transitory computer readable storage medium, such as a computer memory. Alternatively, a module, unit, or system may include a hard-wired device that performs operations based on hard-wired logic of the device. The modules or units shown in the attached figures may represent the hardware that operates based on software or hardwired instructions, the software that directs hardware to perform the operations, or a combination thereof. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally, or alternatively, one or more of these devices may be hard-wired with logic circuits to perform these operations.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

The particular arrangement of components (e.g., the number, types, placement, or the like) of the illustrated embodiments may be modified in various alternate embodiments. For example, in various embodiments, different numbers of a given module or unit may be employed, a different type or types of a given module or unit may be employed, a number of modules or units (or aspects thereof) may be combined, a given module or unit may be divided into plural modules (or sub-modules) or units (or sub-units), one or more aspects of one or more modules may be shared between modules, a given module or unit may be added, or a given module or unit may be omitted.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a computer or a controller (which may become "configured to" perform the task or operation if appropriately programmed) is not "configured to" perform a task or operation unless or until specifically programmed or structurally modified to perform the task or operation.

The various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optic drive, and the like. The storage device may also be other similar means for loading computer programs or other instructions into the computer or processor. As used herein, the term "computer," "controller," and "module" may each include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "module" or "computer." The computer, module, or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer, module, or processor as a processing machine to perform specific operations such as the methods and processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program. The individual components of the various embodiments may be virtualized and hosted by a cloud type computational environment, for example to allow for dynamic allocation of computational power, without requiring the user concerning the location, configuration, and/or specific hardware of the computer system.

The above description is illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f) unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. A manipulation platform, comprising:
  a navigation system configured to locate a position of the manipulation platform and to propel the manipulation platform;
  a manipulation arm extending or extendable from the manipulation platform, and that comprises one or both of: a device that is configured to interact with an item, or a collection sensor that is configured to collect information from a plurality of viewpoints or angles;
  one or more area sensors configured to acquire data representative of at least a portion of an area in which the manipulation platform is located; and
  one or more processors operably coupled with the navigation system, the manipulation arm, and the one or more area sensors, the processing unit configured to:
    determine or predict a presence of an external object within a manipulation range of the manipulation arm using the data acquired by the one or more area sensors, and
    respond to a determination of the external body being, or being predicted to be, within the manipulation range by controlling one or more of the manipulation arm or the manipulation platform, wherein one or both of:
      the manipulation arm movement is stopped, or is controlled so that movement of the manipulation arm is maintained within a first modified, smaller manipulation range such that the external object is not present, or predicted to be present, within the modified, smaller manipulation range, and
      the navigation system restricts movement of the manipulation platform so that such movement of the manipulation platform, and the manipulation arm coupled thereto, is maintained such that the external object is not present, or predicted to be present, within a second modified, smaller manipulation range created by restricted movement of the manipulation platform.

2. The manipulation platform of claim 1, wherein the processing unit is configured to determine the presence of a living being as the external object.

3. The manipulation platform of claim 1, wherein the processing unit is configured to determine if the external object is moving, and if determined to be moving:
  to predict a movement path of the external object, and
  to determine if the predicted movement path intersects with the manipulation range of the manipulation arm.

4. The manipulation platform of claim 1, wherein the one or more area sensors include at least a first detector and a second detector, wherein the processing unit is configured to determine a navigation control action using information from the first detector and to determine a manipulation control action using information from the second detector.

5. The manipulation platform of claim 1, wherein the processing unit is configured to determine whether the manipulation platform is in a narrow portion of an area or an open portion of the area, and to control the manipulation platform according to a first action responsive to determining that the manipulation platform is in the narrow portion and to control the manipulation platform according to a different, second action responsive to determining that the manipulation platform is in the open portion.

6. The manipulation platform of claim 5, wherein the processing unit is configured to control the navigation system to maintain the manipulation platform in a stationary position responsive to determining that the manipulation platform is in the narrow portion and the external object is detected within a buffer zone.

7. A manipulation platform, comprising:
  a navigation system configured to move a manipulation platform;
  a visual recognition unit comprising at least one detector configured to acquire presence information within at least a portion of an area in which the manipulation platform is located; and
  a processing unit operably coupled to the navigation system and the visual recognition unit, the processing unit configured to:
    determine or predict a presence of an external object within at least one determined range of a manipulation arm coupled to the manipulation platform using the presence information from the visual recognition unit; and
    control the navigation system to implement at least one control action responsive to determining or predicting the presence of the external object within the determined range.

8. The manipulation platform of claim 7, wherein the processing unit is configured to determine the presence of a living being as the external object.

9. The manipulation platform of claim 7, wherein the visual recognition unit comprises an area sensor mounted on an adjustment unit configured to at least one of pan or tilt the area sensor.

10. The manipulation platform of claim 7, wherein the visual recognition unit comprises at least a first detector and a second detector, wherein the processing unit is configured to determine a navigation control action using information from the first detector and to determine a manipulation control action using information from the second detector.

11. The manipulation platform of claim 7, wherein the processing unit is configured to determine whether the manipulation platform is in a narrow portion of an area or an open portion of the area, and to control the manipulation platform according to a first action responsive to determining that the manipulation platform is in the narrow portion and to control the manipulation platform according to a different, second action responsive to determining that the manipulation platform is in the open portion.

12. The manipulation platform of claim 11, wherein the processing unit is configured to control the navigation system to maintain the manipulation platform in a stationary position responsive to determining that the manipulation platform is in the narrow portion and the external object is detected within a buffer zone.

13. The manipulation platform of claim 11, wherein the processing unit is configured to control the navigation system to avoid the external object responsive to determining that the manipulation platform is in the open portion and the external object is detected within a buffer zone.

14. The manipulation platform of claim 7, further comprising a manipulation arm configured to at least one of grasp items or provide an adjustable view for collection of information, wherein the processing unit is configured to maintain the manipulation arm in a stationary position when the external object is detected within a manipulation zone.

15. A method for a manipulation platform having one or more extended or extendable manipulation arms, comprising:
 determining or predicting a presence of an external object within at least one determined range of the manipulation platform using presence information obtained using a recognition unit;
 determining at least one control action for the manipulation platform responsive to the determination or prediction of the presence in the range of the manipulation platform; and
 controlling at least one of a navigation system, or the manipulation arm of the manipulation platform, using the at least one control action.

16. The method of claim 15, wherein determining the presence of the external object includes determining a presence of a living being as the external object.

17. The method of claim 15, further comprising determining whether the manipulation platform is within a narrow portion or an open portion of an area, wherein determining the at least one control action comprises using a first strategy to determine the at least one control action responsive to determining that the manipulation platform is in the narrow portion and using a second strategy to determine the at least one control action responsive to determining that the manipulation platform is in the open portion.

18. The method of claim 17, further comprising controlling the navigation system to achieve a speed to zero, or to maintain the manipulation platform in a stationary position, responsive to determining that the manipulation platform is in the narrow portion and the external object is detected within a buffer zone.

19. The method of claim 17, further comprising controlling the navigation system to avoid the external object responsive to the manipulation platform being in the open portion and the external object being detected within a buffer zone.

20. The method of claim 15, further comprising generating a two-dimensional model or a three-dimensional model of the external object.

* * * * *